(12) United States Patent
Li et al.

(10) Patent No.: US 8,570,864 B2
(45) Date of Patent: Oct. 29, 2013

(54) KERNEL AWARENESS OF PHYSICAL ENVIRONMENT

(75) Inventors: Jin Li, Sammamish, WA (US); Hua Chen, Beltsville, MD (US); Sourabh Jain, Minneapolis, MN (US); Sanjeev Mehrotra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 12/970,952

(22) Filed: Dec. 17, 2010

(65) Prior Publication Data

US 2012/0155262 A1 Jun. 21, 2012

(51) Int. Cl.
*H04L 12/26* (2006.01)

(52) U.S. Cl.
USPC .......................................................... 370/230

(58) Field of Classification Search
None
See application file for complete search history.

(56) References Cited

U.S. PATENT DOCUMENTS

| 7,773,519 B2 * | 8/2010 | Prabhakar et al. ............ 370/232 |
| 8,248,930 B2 * | 8/2012 | Felderman et al. ............ 370/230 |
| 2008/0298248 A1 * | 12/2008 | Roeck et al. .................. 370/237 |

OTHER PUBLICATIONS

Brakmo et al.; TCP Vegas: New techniques for congestion detection and avoidance; In Proc. ACM SIGCOMM, pp. 24-35, Aug. 1994.
Chen et al.; Utility Maximization in Peer-to-Peer Systems; Microsoft Research Technical Report, Aug. 2007.
Floyd et al.; Equation-based congestion control for unicast applications; In Proc. ACM SIGCOMM, pp. 43-56, Stockholm, Sweden, Aug. 2000.
Floyd et al.; The NewReno Modification to TCP's Fast Recovery Algorithm, Apr. 1999. RFC 2582.
Ha et al.; Cubic: A new tcp-friendly high-speed tcp variant; ACM SIGOPS Operating System Review, 42(5):64-74, Jul. 2008.
Handley et al.; Tcp friendly rate control (tfrc): Protocol specification; RFC-3448, Jan. 2003.
Jacobson; Congestion avoidance and control; In Proc. ACM SIGCOMM, pp. 314-329, Stanford, CA, Aug. 1988.
Jain et al.; End-to-end available bandwidth: Measurement methodology, dynamics, and relation with TCP throughput; IEEE/ACM Trans. Networking, 11:537-549, Aug. 2003.
Jain et al.; Ten fallacies and pitfalls on end-to-end available bandwidth estimation; In IMC, 2004.
Kelly; Fairness and stability of end-to-end congestion control; European Journal of Control, 9:159-176, 2003.
Kelly et al.; Rate control for communication networks: shadow prices, proportional fairness, and stability; Journal of the Operational Research Society, 49:237-252, 1998.
Low et al.; Optimization flow control, i: Basic algorithm and convergence; IEEE/ACM Trans. Networking, 7(6):861-875, Dec. 1999.
Mehrotra et al.; Hybrid window and rate based congestion control for delay sensitive applications; In Proc. of IEEE Globecom. IEEE, Dec. 2010.

(Continued)

*Primary Examiner* — Minh-Trang Nguyen

(57) ABSTRACT

Described are techniques to use adaptive learning to control bandwidth or rate of transmission of a computer on a network. Congestion observations such as packet delay and packet loss are used to compute a congestion signal. The congestion signal is correlated with information about actual congestion on the network, and the transmission rate is adjusted according to the degree of correlation. Transmission rate may not adjust when packet delay or packet loss is not strongly correlated with actual congestion. The congestion signal is adaptively learned. For instance, the relative effects of loss and delay on the congestion signal may change over time. Moreover, an operating congestion level may be minimized by adaptive adjustment.

17 Claims, 9 Drawing Sheets

(56) References Cited

OTHER PUBLICATIONS

Strauss et al.; A measurement study of available bandwidth estimation tools; In IMC, Oct. 2003.

Tan et al.; A compound TCP approach for high-speed and long distance networks; In INFOCOM, pp. 1-12. IEEE, Apr. 2006.

Zheng et al.; Error-resilient coding of H.264 based on periodic macroblock; IEEE Transactions on Broadcasting, 52:223-229, Jun. 2006.

* cited by examiner

KERNEL AWARENESS OF PHYSICAL ENVIRONMENT

BACKGROUND

In the area of data networks, there has been much effort concerning distributed rate control to control the sending rate of multiple flows over arbitrary network topologies. Previous efforts have aimed to perform rate control in ways that fairly and fully utilize a network while maintaining low operating congestion (which results in low queuing delay and low congestion induced packet loss), and perhaps smooth changes in transmission rate.

To these ends, there have been many variants of congestion or rate control protocols developed. Examples of rate control algorithms include various congestion control algorithms used in the transmission control protocol (TCP) and variants such as: TCP Reno, TCP New Reno, Compound TCP (CTCP), Binary Increase Congestion TCP (BICTCP), TCP Vegas, Fast TCP, Data Center TCP (DCTCP), and others. The TCP-friendly rate control (TFRC) algorithm has also been used a rate control protocol for video conferencing. Algorithms for co-existence of loss and delay based flows, e.g. PERT (Probabilistic Early Response TCP), and MPERT (Modified PERT), have also been used. Available-bandwidth estimation techniques have been proposed and used for some real-time VoIP/video-conferencing applications. There have also been efforts toward utility-maximization based rate control using delay as the congestion signal (primal-dual formulation).

Some rate control techniques have been specifically directed to applications that require low end-to-end latency. End-to-end latency (to be referred to as "E2E") refers to the time from when content is generated (at the sender side) to the time when content is consumed (at the receiver side). Examples of low E2E applications (applications sensitive to end-to-end latency) include real-time media delivery systems such as video conferencing and voice over IP, interactive software such as remote desktop applications, online multi-player games, interactive websites, web-based applications such as Office 365™ and Google Docs™, etc.

With respect to rate control in general, and in particular with respect to rate control with low E2E latency, existing rate control techniques have had shortcomings. High utilization of network bandwidth is often not achieved. Network bandwidth may not be fairly allocated, in particular, amongst multiple conforming flows and amongst additional conforming flows and more aggressive flows such as TCP. Often, there is slow convergence to a steady state of transmission. It may be difficult to dynamically adapt to higher congestion levels when aggressive flows are present. Some rate control algorithms over-oscillate when in a steady state. Moreover, many previous rate control algorithms are not resilient to diversified network conditions such as noise in delay measurements and random packet loss.

Techniques related to bandwidth management are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Described are techniques to use adaptive learning to control bandwidth or rate of transmission of a computer on a network. Congestion observations such as packet delay, packet loss, ECN (Earlier Congestion Notification) marking are used to compute a congestion signal. The congestion signal is adaptively learned to correlate with information about actual congestion on the network, and the transmission rate is adjusted according to the degree of correlation. Transmission rate may not adapt when the congestion signal indicates a low level of congestion, and may decrease when the congestion signal indicates a high level of congestion. The desired congestion level is also adaptively learned. For instance, the relative effects and observation of loss, delay and ECN marking on the congestion signal may change over time. Moreover, a desired operating congestion level may be learnt and minimized by adaptive adjustment.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Figure 1:
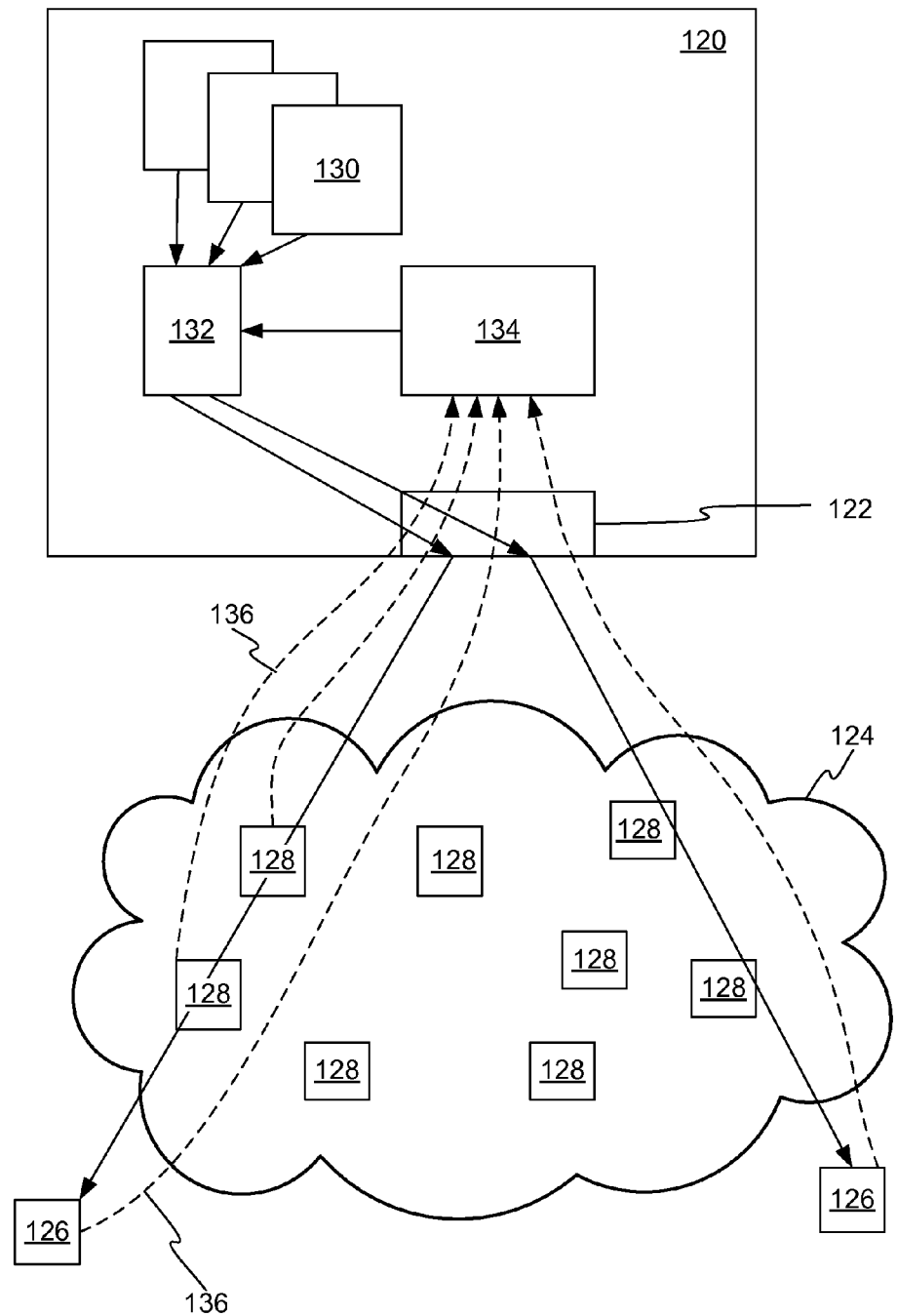
FIG. 1 shows a system for dynamically adaptive rate control.

FIG. 1 shows a system for dynamically adaptive rate control. A node 120 is transmitting data through an interface 122 and network 124 to destination nodes 126. Various routers 128 or the like carry the data through links. The transmitted data may originate from software 130 such as an operating system, a network service, a client etc. A rate controller 132 may control the rate at which the node 120 transmits the data. As will be explained in detail, a learning module 134 obtains congestion measures or congestion signals 136 (e.g., measures of packet loss, delay, ECN marking, etc.), and may associate those measures with current rates of transmission used by the rate controller 132. The congestion signals, represented by dashed lines, may be in the form of feedback from destination nodes 126 and/or feedback from routers 128 carrying traffic from the node 120 to the destination nodes 126.

The learning module 134, in combination with the rate controller 132 may perform various functions for learning-based rate control. Such functions will be briefly mentioned and described in detail below. Parameters for rate control (for instance, as may be used in a utility maximization framework) may be dynamically adjusted to maintain a desired operating congestion level. This may include functionalities such as: increasing the operating congestion level when more aggressive flows (such as TCP) begin; decreasing operating congestion level when such flows end; increasing the operating congestion level for "long flows" with multiple bottlenecks; and decreasing the operating congestion level to levels approaching or at minimal achievable bounds in the presence of conforming flows Other functionalities may include: using a larger timescale to adjust the parameters when compared to the timescale used to adjust the rate; using a rate control scheme where the desired operating congestion level is independent of transmission rate (and thus independent of number of flows on a link; dynamically adjusting the desired operating congestion level by learning what it should be.

Congestion level signals (e.g., queuing delay, packet loss and ECN marking) may be used as predictors of true congestion level. This may involve determining what are the lowest achievable congestion level signals by looking at statistics of these signals in periods of non-congestion. Congestion level signals may also be used as predictors of congestion by finding correlations between these signals and congestion levels in periods of congestion, which may be accomplished by using the congestion level signals as predictors of sending rate; if a signal is a predictor of sending rate, then it is also a predictor of congestion.

Regarding the rate controller 132, as the learning module 134 refines what is known about congestion and congestion signals, it informs the rate controller 132. For example, if current congestion signals are determined to not correlate with actual congestion, then the learning module 134 may inform the rate controller 132 to not adapt the current rate of transmission.

Note that any arbitrary modularization of functionality can be used to allow the node 120 to perform learning-based rate control functions.

Framework and Terminology

A framework within which learning-based rate control can be implemented will now be described. Consider a network to be a graph G with a set of nodes N and links L that connect the nodes. Each link (an edge in the graph), has a certain propagation delay, channel capacity (bandwidth), and perhaps loss rate. Some subset of the nodes $S \subset N$ comprises source nodes that are originally transmitting content via the links. Corresponding to each source $s \in S$, is a receiver node $R_s \subset N$, $|R_s|=1$. Other nodes in the network can be routers, some of which may perform rate control. The links can be wired or wireless, and there may be other underlying physical layer protocols being used (for example in 802.11 type protocols). Note that the underlying link protocols may perform retransmissions on a link which essentially translates random packet loss into noise in delay). For each source $s \in S$, let $\mathcal{L} \subset L$, be the set of links traversed when going from source node "s" to receiver node $R_s$. The rate at which source S transmits is given by $x_s$.

With reference to formulas herein, "congestion level" over a particular link is defined to mean the current amount of outstanding data in the network over that link. In particular if link $l \in L$ has a channel capacity $C_l$, then the congestion level at time t over the link is given by:

$$q_l(t) = \frac{1}{C_1} \int_0^t \left( \sum_{s: l \in \mathcal{L}(s)} (x_s(\tau) - C_1)^+ \right) d\tau. \quad (1)$$

Note that the congestion level over a link typically results in queuing delay and packet losses. However, a theoretical exact formulation as to how congestion level translates to queuing delay and packet losses would be a function of various factors, such as the underlying link and its lower layer protocol, as well as the node at the link which is sending data and its rate control policy and buffer size. Note also that not all delay and packet loss increases are actually caused by congestion level and may simply be random. Although rate control aims to react to congestion level on individual links, usually the end-to-end rate control actually sees end-to-end signals such as loss and delay which may or may not be due to congestion.

In this discussion, it is assumed that a source S sees end-to-end signals such as queuing delay, which will be written as $\delta_s$, and packet loss, which will be written as $\epsilon_s$. The function $\dot{f}(x)$ will be used to denote the derivate of function f with respect to x.

Figure 2:
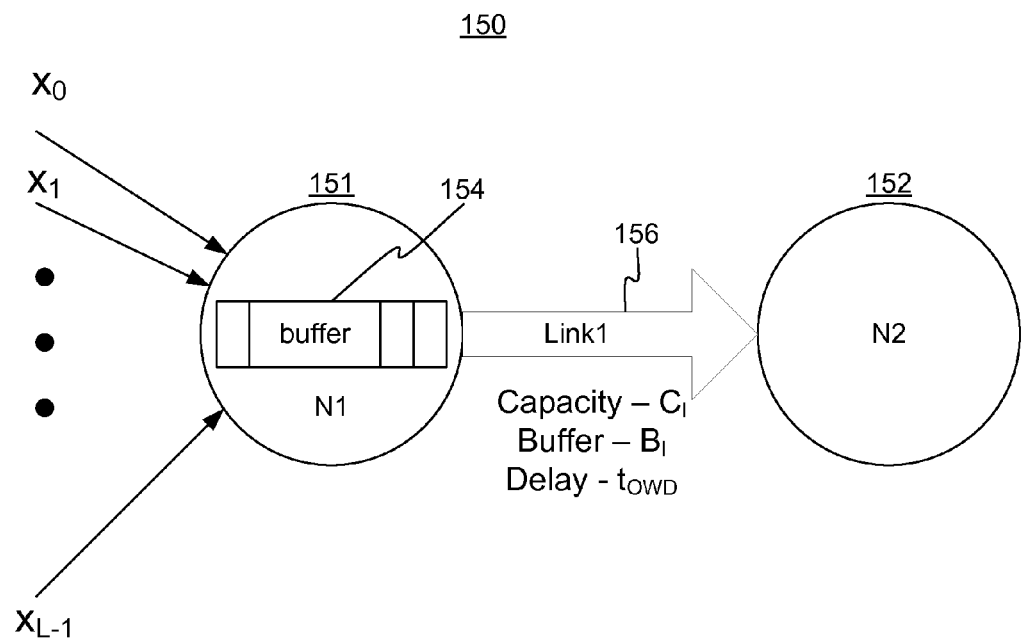
FIG. 2 shows an example congestion model.

FIG. 2 shows an example congestion model 150. For modeling, it will be assumed that each node in the network has a buffer which holds packets that are destined for a given next node. In the example of FIG. 2, all flows which are entering node 151 (node N1) and which are destined for node 152 (node N2) enter a common buffer 154. Each flow has rate $x_s$, and the outgoing link 156 from node 151 to node 152 has buffer of size $B_l$, and capacity $C_l$. As used herein, a flow may be an individual unit of connectivity handled by a node, for example a 5-tuple (local address, local port, remote address, remote port, protocol), a network connection, etc. It will also be assumed that nodes, routers, etc., are communicating with the Internet Protocol (IP) and one or more underlying protocols, for example, variants of TCP, UDP, etc.

Congestion Level Measurement

As an example of how congestion level translates to queuing delay and loss, consider two different rate control policies that may be implemented at individual routers, namely a leaky bucket and token bucket policy.

When a router implements a leaky bucket rate control policy, the router has a queue (buffer) of size B. The router places the packets destined for a particular router port (for example a port with an Ethernet cable connecting to another router) into this queue. The router drains packets from this queue at a constant rate, which is equal to the capacity of that link $C_l$. Thus, if the aggregate incoming rate into the link is larger than the channel capacity, the queuing delay will continue to build up until the buffer size B is filled, after which packets will experience a queuing delay of B and a certain percentage of packets will simply be dropped. That is to say, $\delta_s$ will increase until it is equal to B (where B is in units of delay (i.e. size of buffer in bits/bitrate)), followed by packet loss equal to $\epsilon_s = \dot{q}_l(t)$.

As another example, consider a token bucket policy. Such a policy may be used when the underlying physical medium actually has larger capacity than $C_l$, but the network administration limits the rate on a per-port basis. In this policy, for each outgoing port, tokens are inserted into a token bucket at a constant rate $C_l$, where the token bucket has size B. If there are any tokens remaining in the bucket, then packets are immediately sent. If the token bucket is empty, then packets may either be dropped or placed into a queue. Here, if the packets are simply dropped when the token bucket is empty, then packets will only see loss, and there will not be a queuing delay increase upon congestion. In fact the only congestion indication will be whether the congestion level is below or above a certain threshold.

In practice, either or both of the policies may exist along paths between nodes. In addition, routers may implement other control strategies, such as weighted fair queuing, where different priority packets are placed into different queues to give different congestion signals to different flows, thus giving them different rates of operation.

Finally, consider that some links may have underlying packet loss which is random and not due to congestion, such as may occur with wireless links. In this case, the packet loss may be seen, or if the underlying medium attempts a certain number of retransmission, then some random packet loss may be translated into and seen as random noise in delay.

In addition, other networks may also give other signs of congestion such as ECN (explicit congestion notification) markings, which tell nodes whether router buffers are full beyond some threshold.

In sum, it can be difficult to directly translate observed signals such as loss and queuing delay directly into a measurement of congestion level.

Utility Maximization Framework

To implement an example distributed rate control protocol, in one embodiment the utility maximization framework (described in detail elsewhere) serves as a starting point. In this embodiment, rate control is modeled as the following utility maximization problem, where $U_s(x_s)$ is the utility obtained when rate $x_s$ is used to transmit source S and where x is the vector of source rates for all sources:

$$\max_x \sum_{s \in S} U_s(x_s) \text{ subject to } \sum_{s:l \in \mathcal{L}_s} x_s \leq C_l \forall l \in L.$$

It can be shown that this problem can be solved by solving the equivalent maximization problem of the Lagrangian $L(x, q)$, where x is an S-dimensional vector of source rates and q is an L-dimensional vector of the Lagrange multipliers:

$$\max_{x,q} L(x, q) = \max_{x,q} \sum_{s \in S} U_s(x_s) - \sum_{l \in L} q_l \left( \sum_{s:l \in \mathcal{L}_s} x_s - C_l \right)$$

This problem can be solved by the iterative Primal-dual algorithm and converges to the optimal solution using:

$$\begin{cases} \dot{x}_s = k_s \left[ U_s'(x_s) - \sum_{l \in \mathcal{L}_s} q_l \right]_{x_s}^+ \\ \dot{q}_l = \frac{1}{C_l} \left[ \sum_{s:l \in \mathcal{L}_s} x_s - C_l \right]_{q_l}^+ \end{cases}$$

The point to note here is that the LaGrange multipliers for each of the links $q_l$ is the congestion level over that link as defined in Equation 1. In addition, $\rho_s = \sum_{l \in \mathcal{L}_s} q_l$ is the sum of congestion levels over all links in the path traversed between source node S and receiver node $R_s$.

Assuming a utility function such as $U_s = \alpha_s \log(x_s)$, it is possible to arbitrarily multiply all utility functions by a constant and get the same result; the following rate control algorithm results, where t is any time at $T_1$ is any time period:

$$x_s(t + T_1) = \max\left(0, x_s(t) + k_s\left(\frac{\alpha_s}{x_s(t)} - \beta \rho_s\right)\right). \quad (2)$$

For the case of a single link, since all flows in theory see the same congestion operating point $\rho_s$, in steady state, the following rate allocation (the point at which rate change is zero) is obtained:

$$x_s(t) = \frac{\alpha_s}{\beta \rho_s}.$$

Some observations are to be noted. The final rate allocation is independent of $k_s$. The final rate allocation only depends on the ratio of $\alpha_s/\beta$, which means that if all flows have the same $\alpha_s$, they will all have the same allocation. Similarly, a long flow with two bottleneck links with similar capacity and share on each link will have a congestion level which is twice that of a short flow, and thus will get half the rate. Thus an acceptable rate control strategy is possible when the parameters are chosen carefully and $\rho_s$ can be accurately predicted as a function of queuing delay $\delta_s$ and loss rate $\epsilon_s$.

However, with this scheme the operating congestion point in steady state is given by $$\rho_s = \frac{\alpha_s}{\beta x_s}.$$

Unfortunately, for a given set of parameters $\alpha$ and $\beta$, a congestion operating point results which is inversely proportional to the rate, which means that for a fixed capacity link, the operating congestion point increases as the number of flows increases.

Existing TCP has the same issue, since if TCP throughput is viewed as a function of operating congestion point, the following may be observed:

$$x_s = \frac{L}{t_{RTT}\sqrt{\frac{2\varepsilon}{3}} + t_{RTO}\left(3\sqrt{\frac{3\varepsilon}{8}}\right)\varepsilon(1 + 32\varepsilon^2)},$$

Where L is the packet size, $t_{RTT}$ is the round-trip time, and $t_{RTO}$ is the retransmission time-out value. The variable $\epsilon$ is the loss rate seen by source s. Again, with TCP, the operating congestion point (i.e. the packet loss rate) is inversely proportional to the rate. In view of the above, various issues will be addressed below in implementing bandwidth management protocols, and in particular for low E2E applications. Such issues may include: how to pick an operating congestion point; how to adapt the operating congestion point to network conditions and flows; how to adapt parameters to achieve the desired operating congestion point without giving up fairness; how to correctly estimate the congestion level as defined in Equation 1 by looking at queuing delay and loss; and how to map desired operating congestion point to desired queuing delay and loss.

Before proceeding further, note that Equation 2 is in a form known as Inverse-Increase Additive-Decrease (IIAD), because the increasing portion $\alpha_s/X_s$ is inversely proportional to rate, and the decreasing portion $-\beta \rho_s$ is additive. Note also that the same results can be achieved by using an Additive-Increase Multiplicative-Decrease (AIMD) method according to the following:

$$x_s(t+T_1) = \max(0, x_s(t) + k_s(\alpha_s - \beta \rho_s x_s(t))).$$

This form will be assumed hereafter, although both forms provide the same steady-state rate point. In addition, the effect of a different $\alpha_s$ is to change the final rate allocation.

Hereafter, it is assumed that all the flows have the same $\alpha = \alpha_s$. Then, by defining $\gamma = \alpha/\beta$, the equation is rewritten as the following:

$$x_s(t+T_1) = \max(0, x_s(t) + k_s(\gamma - \rho_s x_s(t))).$$

This is a reasonable formulation because the operating congestion point is simply a function of $\gamma$ and the final steady-state rate. The problem becomes to simply find a value for $\gamma$. The remainder of the discussion deals with properly and dynamically setting $\gamma$ as well as correctly estimating $\rho_s$ from queuing delay $\delta_s$ and loss rate $\epsilon_s$.

Figure 3:
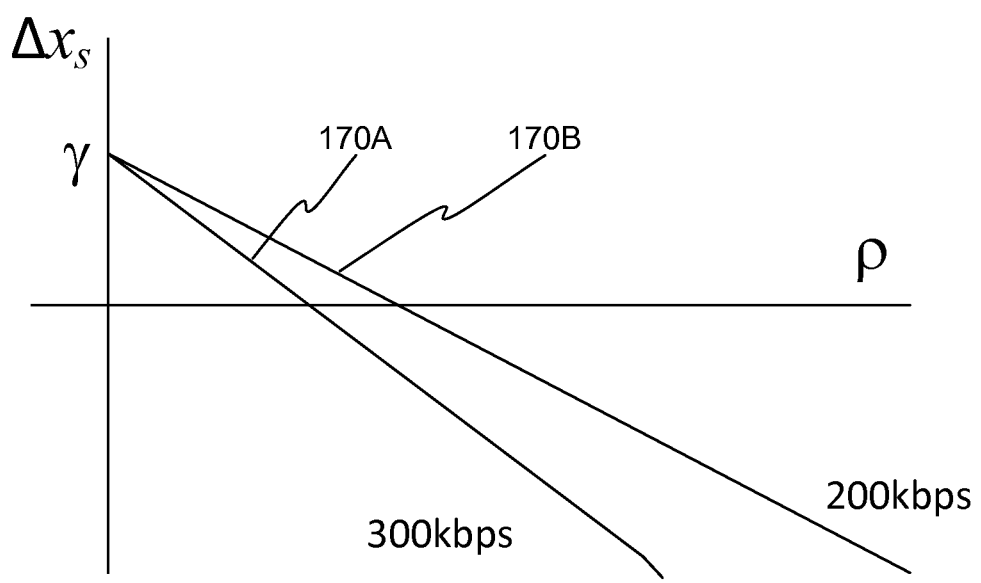
FIG. 3 shows example rate control functions.
Figure 4:
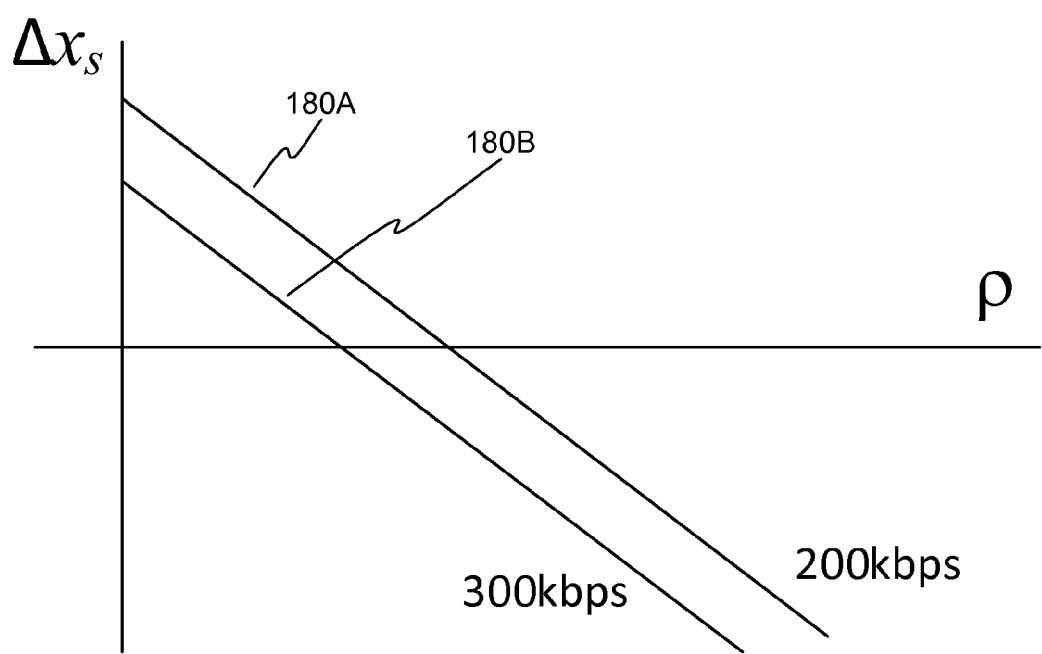
FIG. 4 shows additional rate control functions.

FIG. 3 shows example rate control functions 170A and 170B. Rate control functions 170A and 170B, for AIMD, give rate change as a function of congestion level $\rho$. FIG. 4 shows rate control functions 180A and 180B. Rate control functions 180A and 80B, for IIAD, also give rate change as a function of congestion level $\rho$. Rate change is a delta—an increase or decrease—in the current rate. The functions in FIGS. 3 and 4 are for two different current rates $x_s(t)$ (e.g., 300 kbps and 200 kbps). Note that the operating congestion level (i.e., the point at which the rate change is zero) is different for different rates; smaller rates have a higher operating congestion level than higher rates.

Dynamic Parameter Adaptation

To approach dynamic parameter adaptation in the utility maximization based framework presented above, it may be assumed that a desired operating congestion point $\rho_d = \rho_s$ is known. The subscript d indicates that the operating congestion point is a desired value. Since $\gamma$ is being adapted in a dynamic manner, $\gamma_s$ will be used to denote the value for source S.

One way to perform adaptation is to simply set $\gamma_s = \rho_d x_s$ at some interval which is much slower than the interval used to adapt the rate $T_1$. However, this may not result in all flows converging to the same value of $\gamma$, which will result in unfair allocation. Another way is to adapt a method something like the following three zone AIMD scheme:

$$\gamma_s(t+T_2) = \qquad (3)$$

$$c_s \begin{cases} \gamma_s(t) + \mu_{max} + (\mu_{min} - \mu_{max})\dfrac{\rho}{\rho_d} & \text{if } \rho < \rho_d \\ \gamma_s(t) - \gamma_s(t)\left(\varphi_{min} + (\varphi_{max} - \varphi_{min})\dfrac{\rho - \rho_d}{\rho_1 - \rho_d}\right) & \text{if } \rho_d \leq \rho < \rho_1 \\ \gamma_s(t) - \gamma_s(t)\varphi_{max} & \text{if } \rho_1 \leq \rho. \end{cases}$$

This is a classic AIMD type scheme, where all the flows which share the same bottleneck (and thus see the same congestion level) are guaranteed to converge to the same value of $\gamma$. This happens because the difference between differing values of $\gamma$ reduces every congestion cycle, since the flow with a larger value of $\gamma$ has a larger reduction when encountering congestion (multiplicative decrease), whereas the increase is the same when congestion level is below the desired level. Again, if the parameters $\mu_{max}$, $\mu_{min}$, $\varphi_{max}$, $\varphi_{min}$ are the same, the convergence behavior is the same and independent of the scale factor $k_s$.

The above piece-wise linear formulation is just one which allows $\gamma$ to converge. Other adaptation schemes are also possible which allow convergence. In addition, the converged value becomes $\gamma_s = \rho_d x_s$. If all values converge to the same value, then the rate allocation should maintain the same fairness property as for the case with fixed parameters. Of course the desired congestion point may be different for different flows, depending on the bottlenecks encountered in the path.

Maintaining the optimal allocation for the utility maximization framework is also possible even if different flows have differing values of $\gamma$. To understand how this is possible, think of breaking up the path between source S and receiver node $R_s$ into individual links along the way, and then:

$$\Upsilon_s = x_s \sum_{l \in \mathcal{L}_s} \rho_{d,l},$$

Where $\sigma_{d,l}$ becomes the desired operating congestion point on link l. So long as all flows which go across this link have the same contribution of desired congestion level from this link, the same rate allocation will result.

If $T_2$ is larger than $T_1$ by a significant amount, then by the timescale separation principle, convergence should occur for both $\gamma_s$ as well as $x_s$.

Since $\gamma$ is actually changing the derivative of $x_s$, convergence can be sped up (and an extra timescale can be avoided) by directly adjusting the rate according to:

$$x_s(t+T_1) = k_s \begin{cases} x_s(t) + \alpha_{max} + (\alpha_{min} - \alpha_{max})\dfrac{\rho}{\rho_d} & \text{if } \rho < \rho_d \\ x_s(t) - x_s(t)\left(\beta_{min} + (\beta_{max} - \beta_{min})\dfrac{\rho - \rho_d}{\rho_1 - \rho_d}\right) & \text{if } \rho_d \leq \rho < \rho_1 \\ x_s(t) - x_s(t)\beta_{max} & \text{if } \rho_1 \leq \rho. \end{cases}$$

Figure 5:
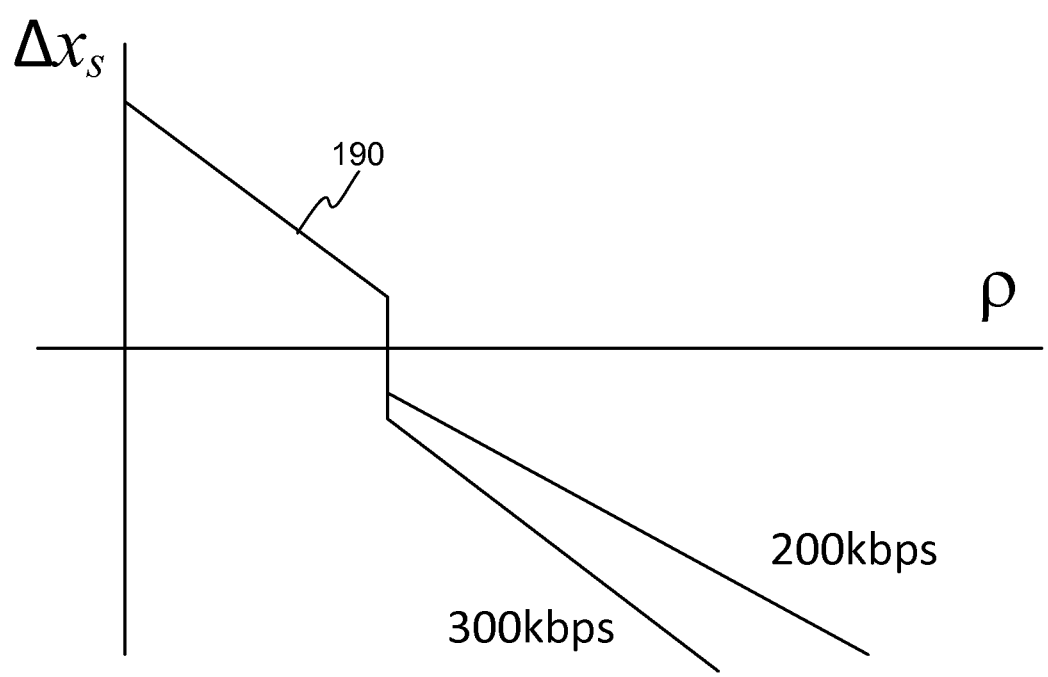
FIG. 5 shows yet another example rate change function.

The desired operating congestion point $\rho_d$ is not a predetermined constant value and is not the same for all flows. In addition, the congestion level is not simply restricted to be the queuing delay observed. The exact rate change is slightly different from that proposed before (i.e. it is piece-wise linear instead of using the TCP-Illinois style rate adjustment curve). An explicit $k_s$ scale factor is available to decouple the operating congestion point from the rate (and congestion level) oscillation in steady state. FIG. 5 shows an example of this rate change function 190. Note that the operating congestion level (zero crossing of the rate change curve) is independent of current transmission rate.

Either of these two schemes can be used. That is to say, either rate can be directly adjusted using the desired congestion level, or indirectly by controlling $\gamma$ using the desired congestion level.

Dynamic Desired Congestion Level Adjustment

In one embodiment, rather than fix the operating congestion level point, it is dynamically adjusted. Not only is this helpful in the case of multiple bottleneck links (since otherwise a long flow would essentially get zero rate), but it is also useful in determining the lowest possible achievable congestion level while still utilizing full network resources. In addition, this approach allows adaptation in the case when more aggressive flows (defined to be those with a higher operating congestion point) become present or when they depart. A scheme to adapt the desired congestion level may use the following:

$$\rho_d(t+T_3) = \max(1-\kappa T_3, 0)\rho_d(t) + \min(\kappa T_3, 1)f(\rho_{observed}, \upsilon)$$

Where $f(\rho_{observed}, \upsilon)$ is the $100*\upsilon$th percentile of the observed queuing delay ($\rho_{observed}$) over a period of length $T_3$ and is chosen to be less than 0.5 (i.e. 50—the percentile value). Essentially, the timescale forgetting factor is $\kappa T_3$; the time period over which $\rho_d$ changes to the new value. Such an adaptation is carried out so long as the $f(\rho_{observed}, \upsilon)$ (for example the 45-th percentile of congestion level) deviates by more than x % (for example 5%) of the current desired value.

In addition, the adaptation need only be carried out when it is determined that the observed periods of congestion level were those periods where congestion was actually present (i.e. observed congestion level was close to or higher than desired congestion level). Longer flows will observe higher congestion levels than shorter flows and thus will increase their desired congestion level. Upon encountering congestion and achieving a desired congestion level, all flows will attempt to decrease their congestion levels to the lowest possible achievable values.

Flows may also choose to reduce their $k_s$ values upon decreasing congestion levels so as to reduce oscillation in congestion level values at the expense of slower convergence times.

Determining when there is Congestion

Discussion to this point has concerned congestion level rather than queuing delay or packet loss. These measurable quantities are defined as congestion level signals. This section deals with interpreting those signals as congestion. Note that both the previous and current section may be relevant for low E2E delay scenarios. However, the present section, while generally applicable, may have use for high E2E delay scenarios or in cases where the desired operating "congestion level signals" are within the random noise of the system, for example cases where random loss is inherently present.

Two aspects of how "congestion level signals" relate to "congestion level" will be considered: the lowest observed "congestion level signal" which should be taken to mean congestion; and when congestion is observed, how much to react to it. One method to address these is the following: the lowest observed "congestion level signal" which indicates congestion is occurring can be taken to be the mean plus some constant times the standard deviation of the observed signal in the non-congested state. A non-congested state is defined to be a state where the observed congestion level is significantly lower than the desired congestion level. For example, for queuing delay, it can be said that $\rho=0$, if $\delta_{observed}$<mean$(\delta_{non\text{-}congested})+c_1$stddev$(\delta_{non\text{-}congested})=\delta_0$. This can be similarly defined for loss.

How much to react each of these signals can also be learned, for example, by trying to compute a linear regression of transmission rate as a function of delay and loss observed (especially looking at those intervals where the desired delay and loss are close to the observed delay and loss). For those intervals, a linear fit can be estimated for rate as $x_s=\lambda\delta+\theta\epsilon+\eta$. The coefficients in this linear are then used fit when changing the rate. If increasing rate results in decreasing delay or loss, for example if $\lambda<0$, then set $\lambda$ to zero using $\lambda:=\max(\lambda, 0)$ and similarly $\theta:=\max(\theta, 0)$.

Using these two equation along with the previous discussion, a rate adjustment protocol which reacts to "congestion level signals" of loss and delay can be derived as follows:

$$x_s(t+T_1) = k_s\lambda_s \begin{cases} x_s(t) + \alpha_{max} & \text{if } \delta < \delta_0 \\ x_s(t) + \alpha_{max} + (\alpha_{min} - \alpha_{max})\dfrac{\delta - \delta_0}{\delta_d - \delta_0} & \text{if } \delta_0 \leq \delta < \delta_d \\ x_s(t) - x_s(t)\left(\beta_{min} + (\beta_{max} - \beta_{min})\dfrac{\delta - \delta_d}{\delta_1 - \delta_d}\right) & \text{if } \delta_d \leq \delta < \delta_1 \\ x_s(t) - x_s(t)\beta_{max} & \text{if } \delta_1 \leq \delta, \end{cases}$$

-continued $$x_s(t+T_2) = k_s\theta_s \begin{cases} x_s(t) + \alpha_{max} & \text{if } \epsilon < \epsilon_0 \\ x_s(t) + \alpha_{max} + (\alpha_{min} - \alpha_{max})\dfrac{\delta - \delta_0}{\delta_d - \delta_0} & \text{if } \epsilon_0 \leq \epsilon < \epsilon_d \\ x_s(t) - x_s(t)\left(\beta_{min} + (\beta_{max} - \beta_{min})\dfrac{\delta - \delta_d}{\delta_1 - \delta_d}\right) & \text{if } \epsilon_d \leq \epsilon < \epsilon_1 \\ x_s(t) - x_s(t)\beta_{max} & \text{if } \epsilon_1 \leq \epsilon \end{cases}$$

Figure 6:
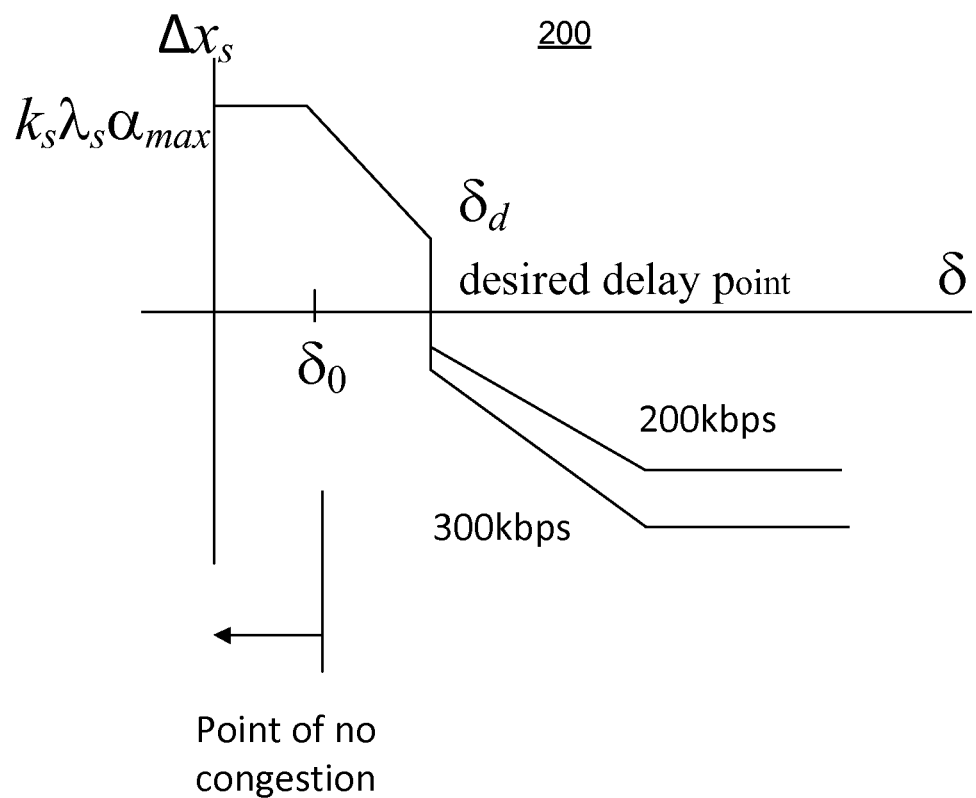
FIG. 6 shows an example rate change curve as a function of observed packet loss.

Note that the parameters $\alpha_{max}$, $\alpha_{min}$, $\beta_{max}$, $\beta_{min}$ will likely be different for the two adaptations for each of the congestion level signals, and the interval over which adaptation is done, $T_1$, $T_2$, will be different. Note also that for both congestion signals a minimum is defined below which t. In addition, parameters $\lambda$, $\theta$ can be added, which are learned. If no correlation exists between a congestion signal and congestion level, then no rate change takes place due to that signal. FIG. 6 shows an example of the rate change curve 200 as a function of observed packet loss.

Finally, note that the final rate allocation is "fair" and the same as the original utility maximization problem even if $\lambda$, $\theta$ go to various values, provided that the correlation is observed. Only the rate of convergence changes as a result. The desired congestion level signals should correctly converge ($\delta_d$, $\epsilon_d$) and that the congestion level signals in the non-congested state are observed to be the same ($\delta_0$, $\epsilon_0$).

The loss rate can be determined using a method proposed in TFRC, i.e. using the inverse of a weighted average of interval lengths between loss events. A similar scheme can be used if $\gamma$ is adapted as in Equation 3, and rate as adapted as in Equation 2.

Figure 7:
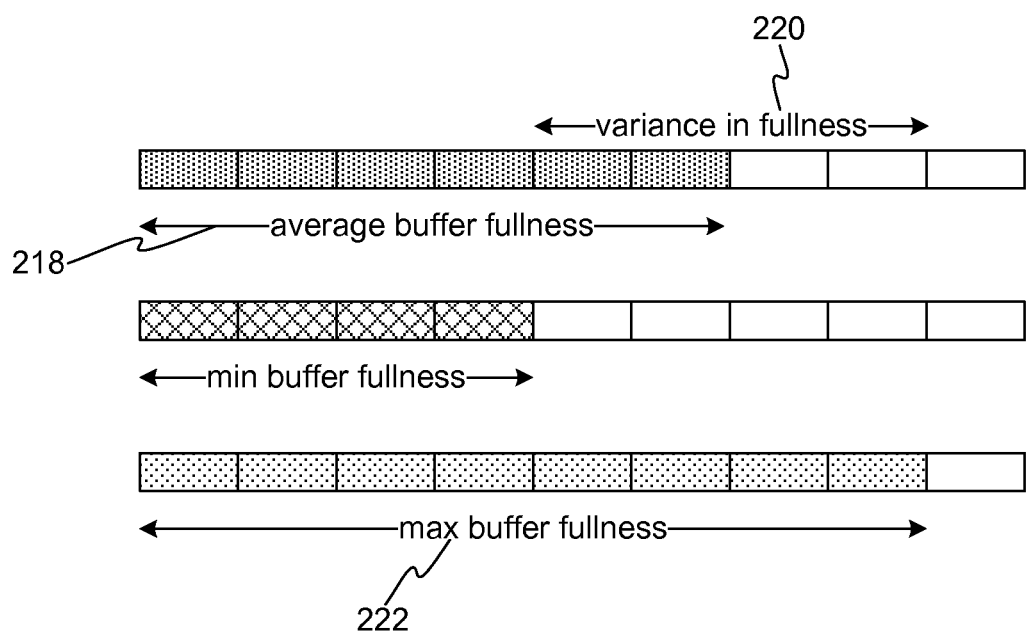
FIG. 7 shows example buffer and congestion behavior.
Figure 8:
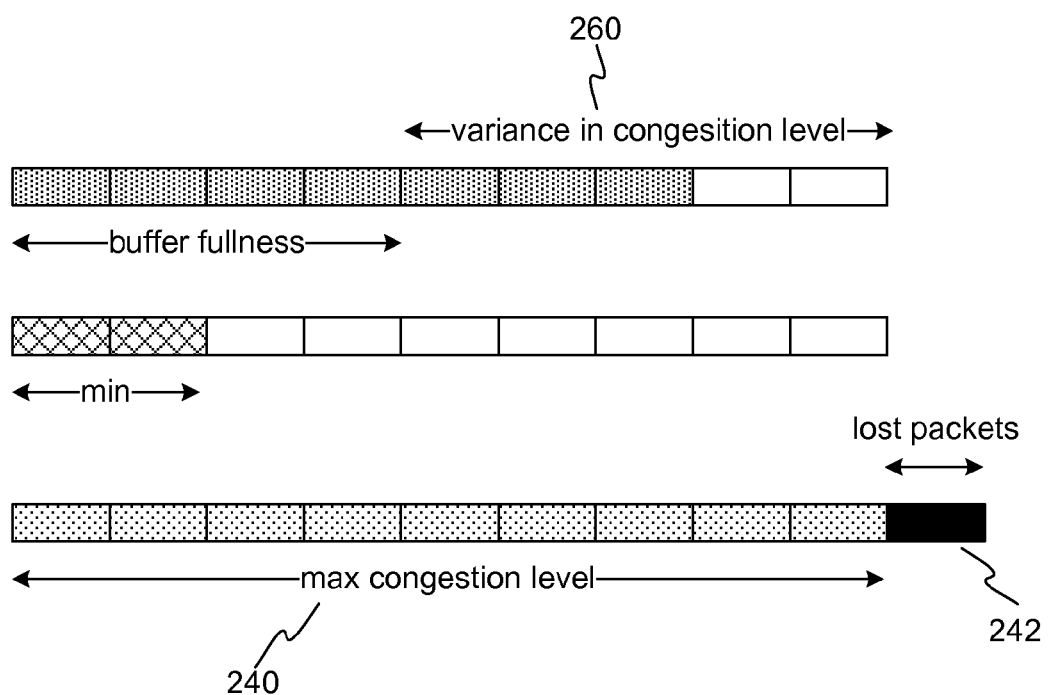
FIG. 8 shows buffer behavior with large variance in buffer fullness.

FIG. 7 shows example buffer and congestion behavior. Even when simple leaky bucket router policing is present with no random packet loss and no noise in delay, the true congestion level can result in both delay and loss based congestion signals. Consider the example shown in FIG. 7. A buffer has average buffer fullness 218 of B, but there is variance 220 in the congestion level (oscillation caused by $k_s$ as well as the RTT needed for feedback). FIG. 7 shows the case where the variance 220 is small enough and the average buffer fullness 218 is of the correct value such that maximum buffer fullness 222 does not result in packet loss, and thus queuing delay is a sufficient measure of congestion level. However, as seen in FIG. 8, there can be a case where the variance in buffer fullness is large enough such that in the period of maximum congestion level 240 a queuing delay will increase up to the maximum buffer size B, followed by packet loss 242.

Parameters

There are several parameters that are to be chosen, for example, $\delta_1$, $\epsilon_1$. These parameters are set to be 2× the desired value, for example $\delta_1=2\delta_d$. Other values to be chosen are $\alpha_{max}$, $\alpha_{min}$, $\beta_{max}$, $\beta_{min}$ for both the delay and loss adaptation. To prevent large oscillations, set $\alpha_{min}=\alpha_{max}$ min $(1, \sigma_\delta/\delta_d)$, where $\sigma_\delta$ is the standard deviation in the observed queuing delay. That is, if the standard deviation in the observed delay is small, so is the gap in change in transmission rate. Similarly, set $\beta_{min}=\beta_{max}$min $(1, \sigma_\delta/\delta_d)$. Convergence to a fair share is guaranteed while $\alpha_{min}\neq0$, $\beta_{min}\neq0$. Moreover, $\alpha_{max}$, $\beta_{max}$ can be chosen by heuristic, and perhaps can be made similar to that used in TCP to provide fairness. Also, $k_s$ can be chosen to be large initially when operating congestion level (initial value) is high so as to achieve quick convergence to a high rate. It can then be lowered as time progresses and the operating congestion level reduces. Finally, $T_1$, $T_2$ can also be chosen using heuristics and can perhaps be made to be similar to what TCP uses (react to every ACK, NACK) or perhaps a larger timer interval.

If the rate is not directly adjusted and instead γ is adapted according to Equation 3, then choose $\mu_{max}, \mu_{min}, \phi_{max}, \phi_{min}$ in the same manner as $\alpha_{max}, \alpha_{min}, \beta_{max}, \beta_{min}$.

Although the discussion has related to making the system operate such that the average congestion level is controlled while giving a fair allocation, it is important to note that the variance in congestion level is also important to control. The variance in congestion level is relevant to maintaining full link utilization and to making sure that congestion level signals such as queuing delay and packet loss (which are important to application performance) are controlled. For example, FIG. 8 shows the case where a large congestion level variance 260 results in some packets having a large queuing delay (larger than the average) as well as some packets being lost.

Figure 9:
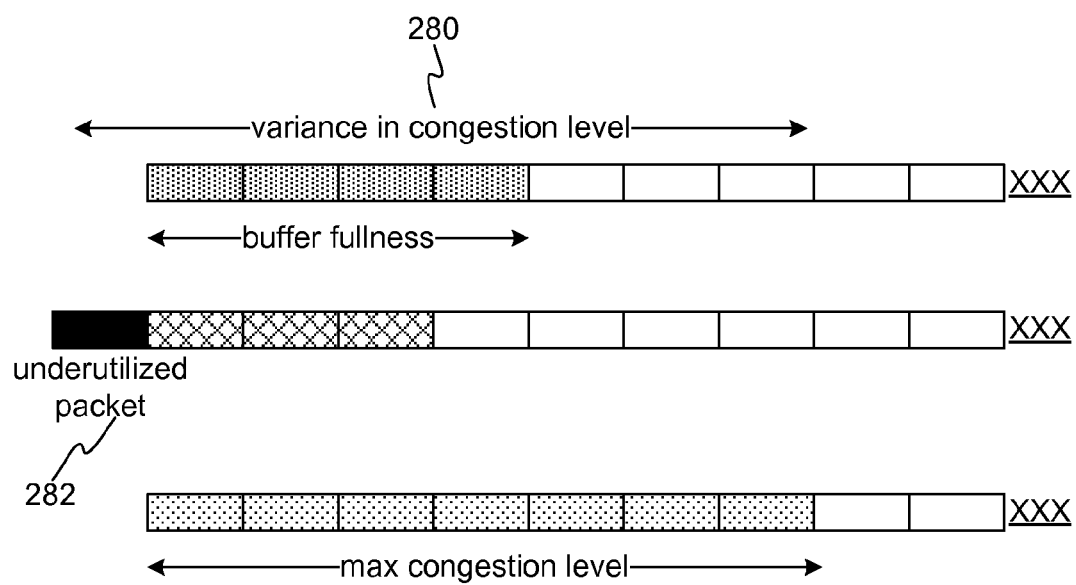
FIG. 9 shows a case of buffer underflow caused by large variance in congestion level.

FIG. 9 shows a case of buffer underflow, where the variance in congestion level 280 is large enough to cause the buffer to remain empty for a long duration of time. Since the buffer cannot be negative, i.e. there is no "save up" rate for the future, link under-utilization 282 may occur (this is mostly an issue for the leaky bucket rate policing). Thus, it can be helpful to control the variance in congestion level 280 as well. To control variance in congestion level 280, realize that the variance of congestion level 280 has in effect been decoupled from the average congestion level in the formulation. The average congestion level $\rho_d$ is essentially controlled by $\delta_d$ and $\epsilon_d$, whereas the variance in congestion level is essentially determined by $k_s$, the time it takes for feedback to come (i.e. the RTT of the link), and the amount of discontinuity at the desired operating congestion point. Notably, for all rates to have the same operating congestion level, there should be a discontinuity in the rate change curve (if rate is being directly changed), or in the γ change curve. This will result in oscillation of the rate even in steady state since.

To prevent variance from being too large, lower $k_s$ in case the RTT is large, and lower $k_s$ as $\rho_d$ drops. Also it may be helpful to minimize the discontinuity gap when rate is stabilizing.

Fast Startup

To achieve the desired rate, an embodiment may employ something similar to "slow start" in TCP. In particular, quickly increase the rate to some value by doubling the rate upon no-congestion until the first sign of congestion is hit. Since convergence is guaranteed regardless of initial state, this can be used as the initial state for starting the proposed rate control.

Conclusion

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a transmitting computer that originally transmits over a network comprised of links to receiving computers, the method comprising:
    transmitting packets over the network to destination computers, wherein the transmitting is performed at a transmitting rate that changes over time;
    obtaining network observations that at times indicate congestion of a portion of the network carrying packets transmitted by the transmitting computer; and
    changing the transmitting rate of the transmitting computer by correlating the network observations with previous rates of transmission of the transmitting computer, wherein a congestion level signal is computed based on the network observations, and wherein the changing is performed such that an amount of rate adaptation is proportional to a computed degree of correlation between the congestion level signal and computed actual congestion, and wherein an operating congestion level used for changing the transmitting rate corresponds to a rate of transmission at or above which transmitted packets will experience observable loss and/or delay as a result of congestion of the portion of the network.

2. A method according to claim 1, wherein the network observations comprise information about loss of packets transmitted by the transmitted computer, or information about delay of packets transmitted by the transmitting computer, or ECN (explicit congestion notification) marking, or a combination thereof.

3. A method according to claim 1, wherein the changing the transmitting rate comprises dynamically adapting the operating congestion level of the transmitting computer; and
    whenever the current congestion level signal is above the operating congestion level, the transmitting rate is decreased;
    whenever the current congestion level signal is below the operating congestion level, the transmitting rate is increased.

4. A method according to claim 1, further comprising finding a lowest achievable congestion level based on statistics of the network observations during periods of time determined to have no network congestion.

5. A method according to claim 4, further comprising finding correlation between the congestion level signal and congestion level during periods of congestion by using the congestion level signal as a predictor of the rate of transmitting.

6. One or more computer-readable storage media storing information to enable a computer to perform a process, the process comprising:
    performing rate control to control rate of transmission of the computer onto a network, wherein the rate control controls the rate of transmission according to a target operating congestion level; and
    dynamically adjusting parameters of a utility maximization framework executing on the computer to dynamically adapt the target operating congestion level, wherein the target operating congestion level comprises a level of congestion such that if current measured congestion is below the operating congestion level then increasing the rate of transmission will not increase congestion and if the current measured congestion is above the operating congestion level then decreasing the rate of transmission will decrease congestion, and wherein the adjusting the parameters alters both the target operating congestion level and alters how the rate of transmission is adapted.

7. One or more computer-readable storage media according to claim 6, wherein the adjusting causes the operating congestion level to increase when new transmission control protocol (TCP) flows start.

8. One or more computer-readable storage media according to claim 7, wherein the adjusting causes the operating congestion level to lower when the TCP flows finish.

9. One or more computer-readable storage media according to claim 6, the process further comprising decreasing the operating congestion level to a lowest achievable bound in the presence of conforming flows, conforming flows comprising flows on the network that are rate-controlled by other instances of the process executing on other computers on the network.

10. One or more computer-readable storage media according to claim 6, further comprising adjusting the parameters at a first frequency, and adjusting the operating rate of transmission, according to the parameters, at a second frequency.

11. One or more computer-readable storage media according to claim 10, wherein the second frequency is greater than the first frequency, whereby the rate of transmission is updated more frequently than the parameters.

12. One or more computer-readable storage media according to claim 6, wherein the target congestion level is independent of the rate of transmission.

13. A method performed by a computer transmitting packets on a network, the method comprising:
repeatedly obtaining network information comprising information indicating delay and/or loss of packets transmitted by the computer;
using the network information to adaptively learn how to form a congestion signal that is used to control a rate of transmission of the computer according to an operating congestion level, the congestion signal comprising information about queue times of packets or about packet loss; and
automatically learning the operating congestion level, wherein the rate of transmission is lowered and raised according to whether a current congestion level is above or below the operating congestion level.

14. A method according to claim 13, wherein the learning comprises adjusting parameters of a regression computation to control the rate of transmission.

15. A method according to claim 13, wherein the network information comprises at least a first factor and a second factor, respectively comprising a different one of: loss information, delay information, explicit congestion notification (ECN) markings, or round trip times.

16. A method according to claim 15, wherein, according to the adaptive learning, the first and second factors have varying relative contribution to the congestion signal.

17. A method according to claim 13, wherein the using the network information to adaptively learn how to form a congestion signal comprises:
measuring loss, delay, and ECN (explicit congestion notification) marking at different transmission rates;
performing a linear regression to calculate a change rate of loss, delay, and ECN marking with regard to the change rate; and
forming the congestion signal by using the change rate to combine loss, delay, and ECN marking into an aggregated congestion signal.

* * * * *